(12) United States Patent
Best et al.

(10) Patent No.: US 6,698,528 B2
(45) Date of Patent: Mar. 2, 2004

(54) FERTILIZER COULTER WITH TRASH-SHEDDING, VIBRATORY CLEANING TIME

(75) Inventors: Donald T. Best, Yorkton (CA); Dale S. Ryczak, Theodore (CA); John A. Lesanko, Sturgis (CA); Murray K. Just, Yorkton (CA)

(73) Assignee: Morris Industries, Ltd., Saskatchewan (CA)

( * ) Notice: Subject to any disclaimer, the term of this patent is extended or adjusted under 35 U.S.C. 154(b) by 0 days.

(21) Appl. No.: 10/185,625

(22) Filed: Jun. 28, 2002

(65) Prior Publication Data

US 2004/0000411 A1 Jan. 1, 2004

(51) Int. Cl.⁷ .............................................. A01B 15/16
(52) U.S. Cl. ...................................... 172/566; 172/610
(58) Field of Search ........................ 172/566, 558–564, 172/49, 96, 572, 606–610; 111/52, 142, 139, 140, 141, 191, 130

(56) References Cited

U.S. PATENT DOCUMENTS 6,024,179 A  2/2000 Bourgault .................. 172/566

Primary Examiner—Christopher J. Novosad
(74) Attorney, Agent, or Firm—Hovey Williams LLP

(57) ABSTRACT

A coulter assembly has a resilient spring tine that bears against the compression face of the angled coulter during field operations to remove dirt clumps that otherwise inhibit the furrow-forming action of the coulter. A special spring coil mounting of the tine provides a lively vibratory action as the tine encounters various impact loads from different directions during field operations, thus rendering the tine essentially self-cleaning insofar as trash accumulations are concerned. The angle of attack of the tine relative to the ground and the coulter can be readily adjusted without diminishing the vibratory action of the tine.

12 Claims, 6 Drawing Sheets

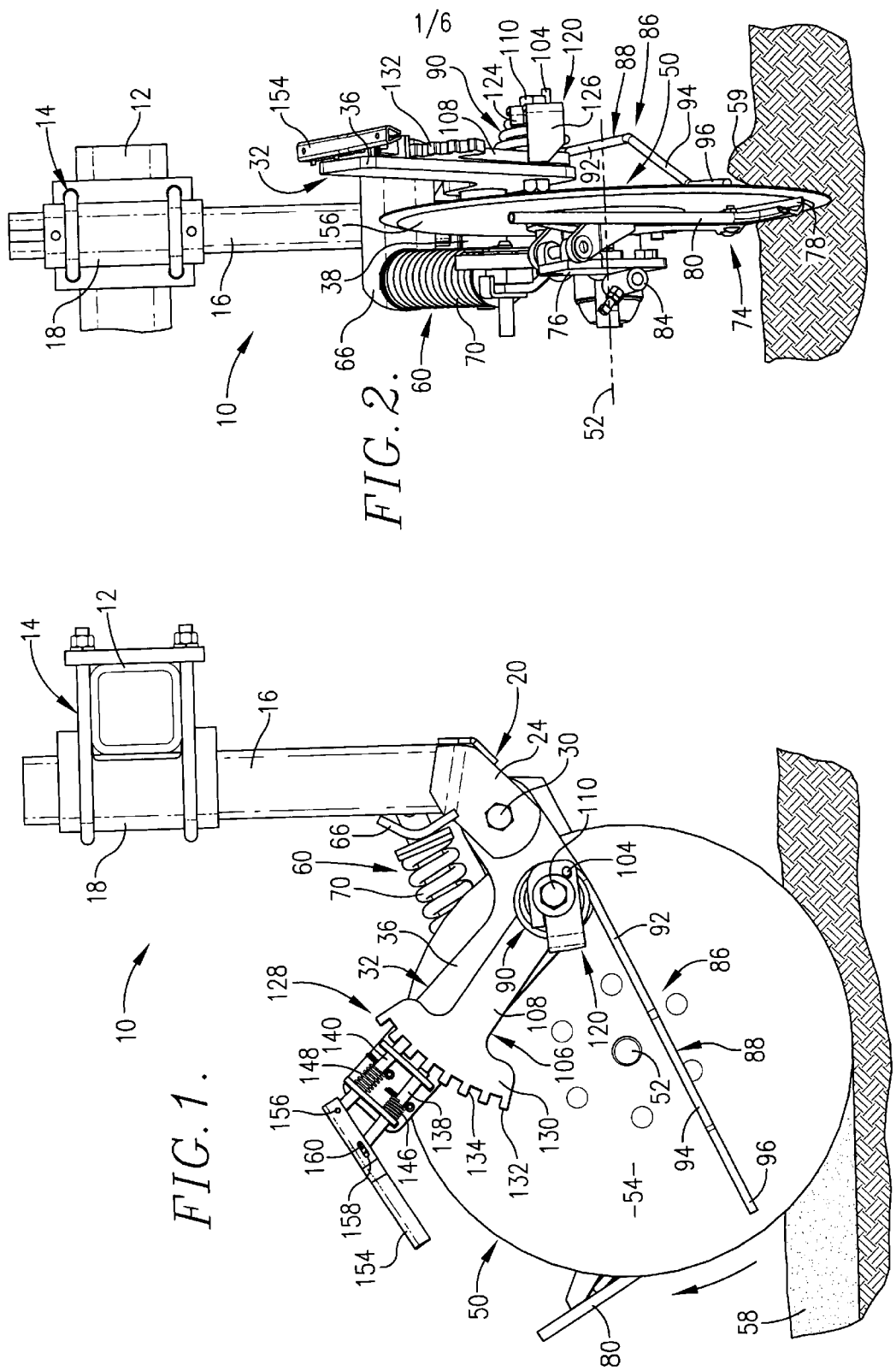

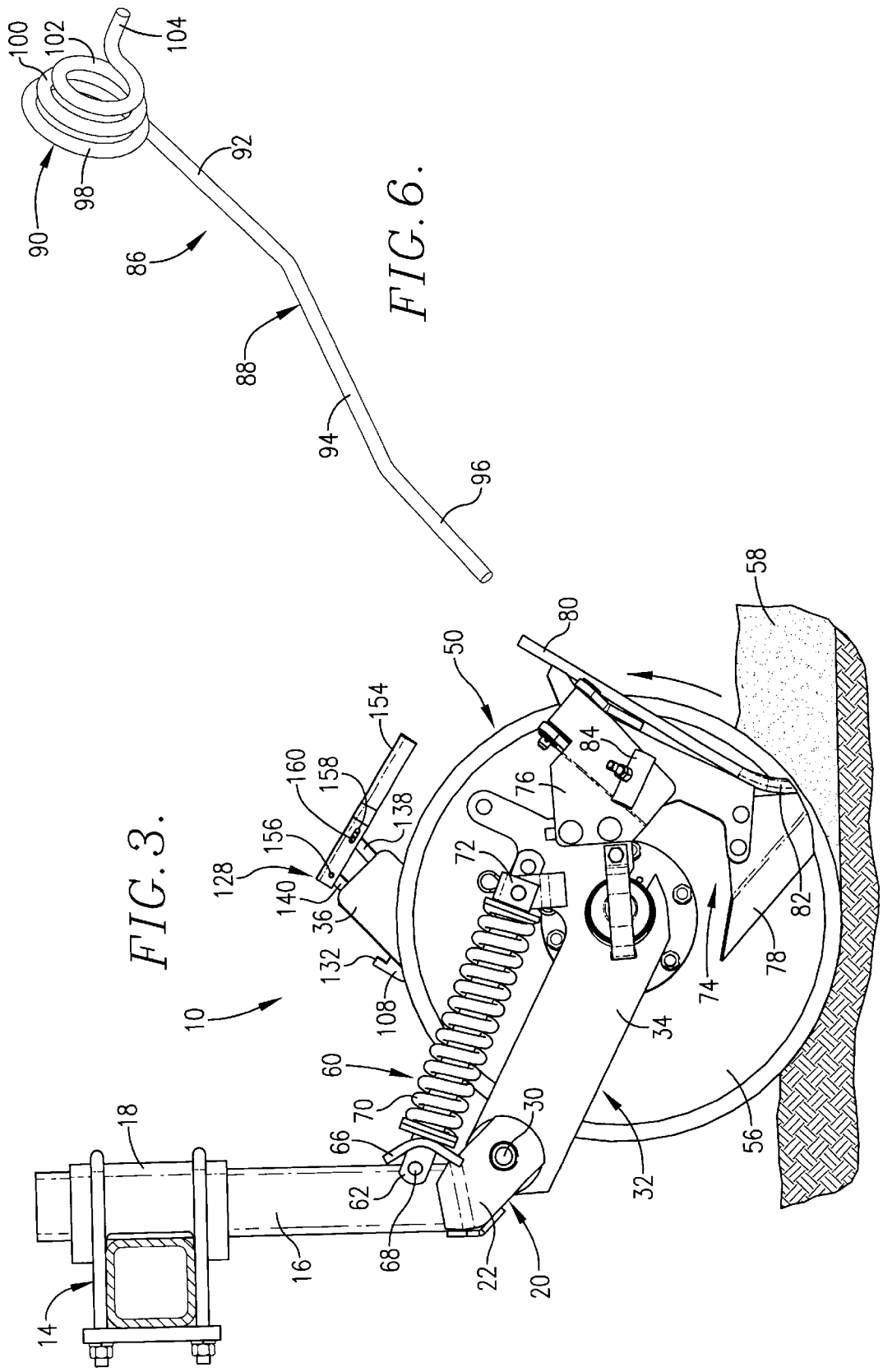

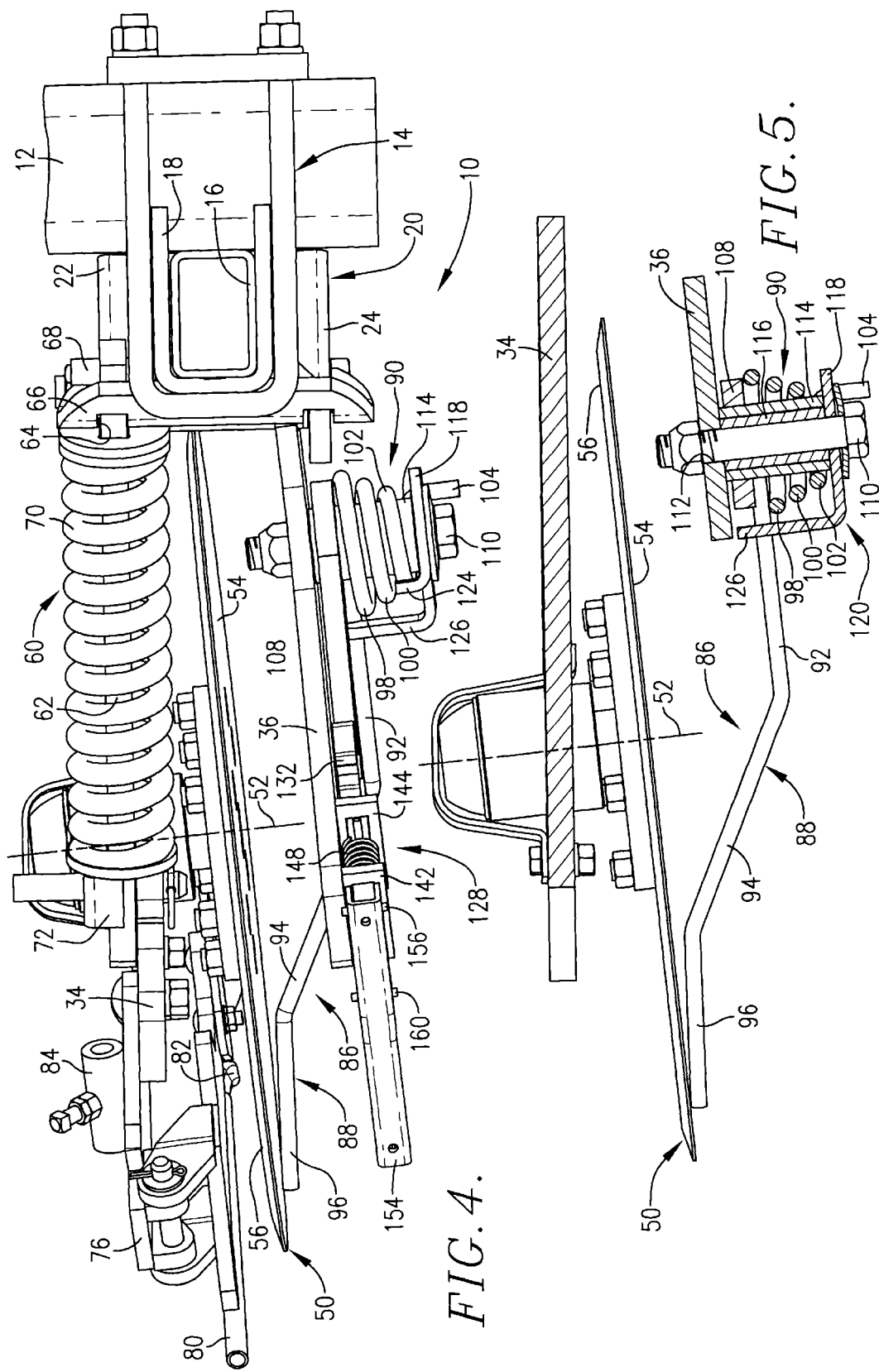

FERTILIZER COULTER WITH TRASH-SHEDDING, VIBRATORY CLEANING TIME

TECHNICAL FIELD

The present invention relates to farm equipment and, more particularly, to a coulter assembly which may be attached to the frame of an implement and used for introducing seeds, fertilizer or both into the ground as the implement is advanced.

BACKGROUND

It is known in the art to use an angled coulter blade to open a furrow in the soil that receives seeds, fertilizer, or both. The generally flat coulters are most often used in fields where it is necessary to cut through trash left on the surface of the fields from previously harvested crops.

It is also well known to use a variety of scrapers on one or both faces of the coulter to keep mud from accumulating on those faces and interfering with proper functioning of the unit. One mechanism of this type is disclosed in U.S. Pat. No. 6,024,179 which shows a floating scraper blade against the trailing face of the angled coulter and a rigid tine on the leading or "compression" face of the coulter. However, the rigid tine in the '179 patent is designed and adapted to collect trash during operation and form what is referred to as an "organic wear pad" to remove soil build-up and avoid excessive wear between the coulter and the tine. In heavy trash conditions, such accumulation and build-up of trash materials can be detrimental to proper functioning of the coulter.

SUMMARY OF THE INVENTION

The present invention provides a coulter assembly with a cleaning tine that removes accumulating soil from the face of the coulter and yet has the ability to shed itself of trash that otherwise tends to accumulate and build up, thus avoiding the problems of excessive trash build-up suffered by prior art devices. This ability to shed trash is derived from a resilient mounting arrangement for the tine so that it exhibits a live, vibratory action during field operations as countless random forces impact the tine from a variety of different angles. Instead of having a stiff and rigid mounting as in the prior art, the tine of the present invention has a transverse spring coil at its mounting end that allows the tine to actively deflect and vibrate as dirt clods and trash impact the tine, such erratic movement having the effect of dislodging trash materials before they can accumulate on the tine in any significant way. Thus, metal-to-metal contact between the working tip of the tine and the face of the coulter is promoted. Furthermore, the spring coil is made in such a way that its adjacent convolutions progressively increase in diameter as the working leg of the tine is approached. Thus, when mounted on a supporting surface or hub passing through the center of the coil, one or more of the coils closest to the working leg of the tine can be diametrically spaced out of contact with the hub so as to provide spring action by resiliently contracting in diameter as the working leg is deflected. This oversizing of convolutions adjacent the working leg also facilitates resiliency in a transverse direction so the working leg can vigorously flex toward and away from the face of the coulter. Additionally, the tine is mounted in an adjustable manner so that its angle relative to the ground surface can be changed independently of the coulter to provide the best trash-shedding and coulter cleaning action.

BRIEF DESCRIPTION OF THE DRAWINGS

FIG. 1 is a right side elevational view of a coulter assembly constructed in accordance with the principles of the present invention, the assembly being illustrated in field operation;

FIG. 2 is a rear elevational view thereof;

FIG. 3 is a left side elevational view thereof;

FIG. 4 is a top plan view of the coulter assembly with the mounting bar of the implement frame fragmentarily shown;

FIG. 5 is a fragmentary cross-sectional view of the assembly taken along a horizontal cut plane passing through the pivot axis of an adjustable mounting member of the assembly;

FIG. 6 is an isometric view of one embodiment of a spring tine constructed in accordance with the principles of the present invention;

DETAILED DESCRIPTION

Figure 7:
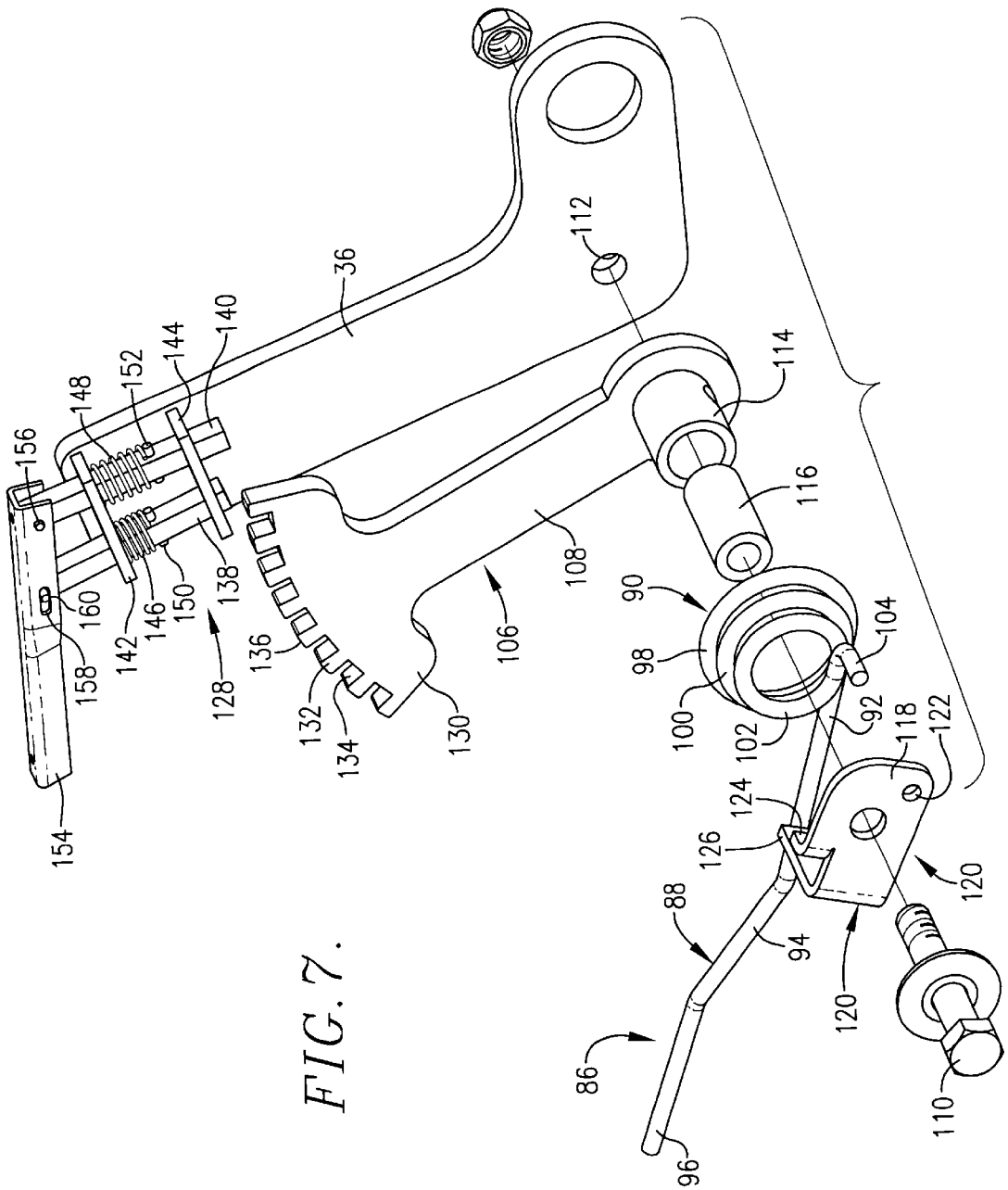
FIG. 7 is an exploded isometric view of certain components of the coulter assembly.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

As shown particularly in FIGS. 1–4, a coulter assembly constructed in accordance with the principles of the present invention is broadly denoted by the numeral 10 and is adapted for attachment to the frame 12 of a farm implement (not shown). A U-bolt clamp assembly 14 accomplishes this function in the illustrated embodiment. Coulter assembly 10 in FIG. 1 is illustrated as moving from left to right during field operations, as well understood by those skilled in the art.

The coulter assembly 10 includes an upright tubular support 16 of generally rectangular cross-sectional configuration, such support 16 being adjustably received within and secured to a collar 18 that is in turn clamped to the frame 12 by the U-bolt clamp assembly 14. At its lower end, support 16 has a yoke 20 presented by a pair of laterally spaced apart, downwardly and rearwardly extending ears 22 and 24 (see also FIG. 10). Ears 22 and 24 are provided with a pair of corresponding holes 26 and 28 (FIG. 10) that are transversely horizontally aligned for the purpose of receiving a pivot bolt 30 defining a first transverse axis of swinging or pivoting movement as will hereinafter be further described.

Figure 10:
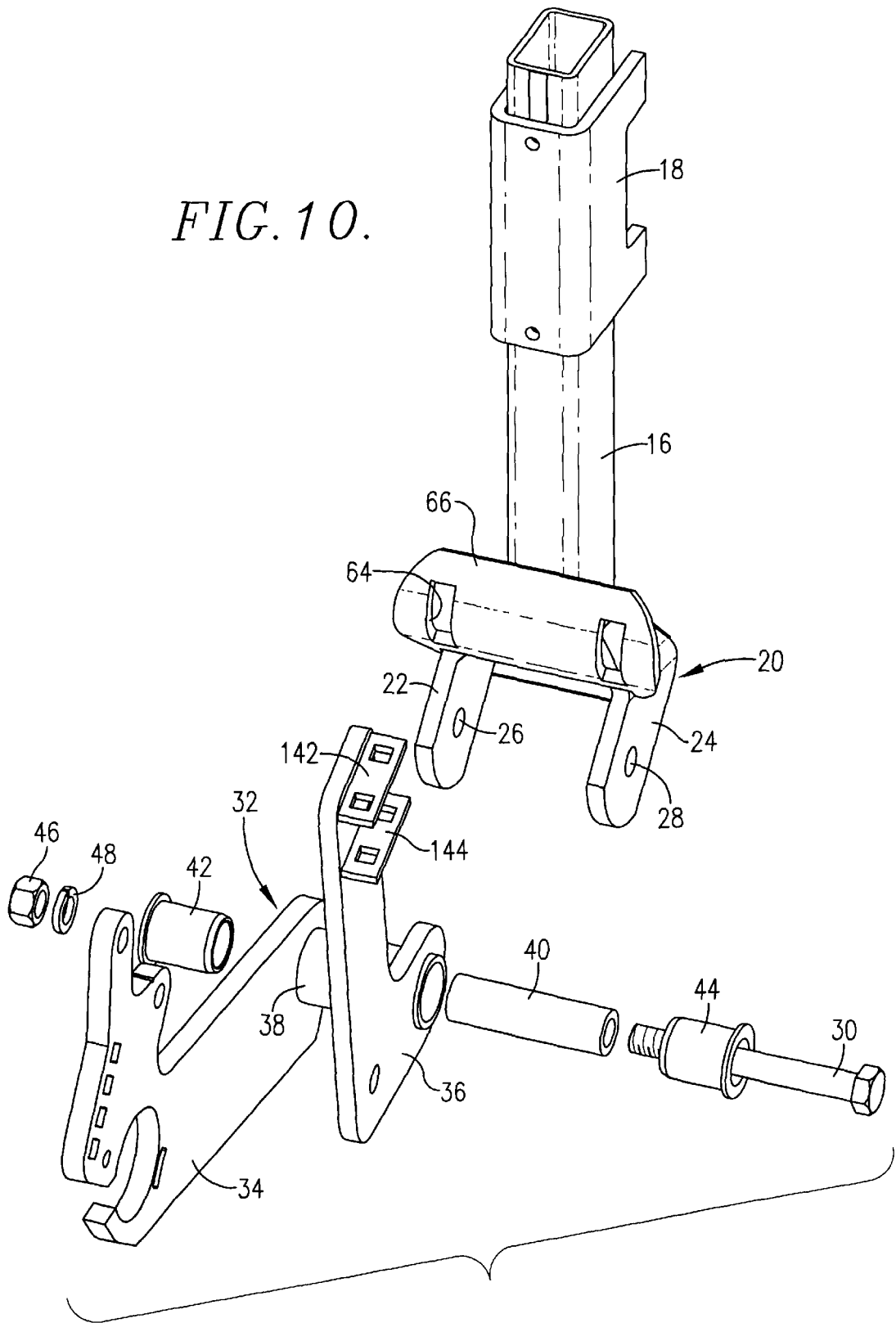
FIG. 10 is an exploded isometric view of certain components of the coulter assembly illustrating details of construction.

Pivotally attached to yoke 20 via bolt 30 is a generally U-shaped carrier 32 (see FIG. 10 in particular) comprising a pair of laterally spaced arms 34 and 36 that are rigidly interconnected adjacent their forward ends by a transversely extending, cylindrical hub 38 welded at its opposite ends to the arms 34,36. As shown in FIG. 10, hub 38 houses a tubular spacer 40 on bolt 30, as well as a pair of bushings 42 and 44 on opposite sides of spacer 40. A nut 46 and lock washer 48 retain bolt 30 and carrier 32 on yoke 20.

A generally flat, sharp-edged coulter blade 50 is rotatably supported on arm 34 of carrier 32. While arm 34 is disposed in generally perpendicular relationship to hub 38, the axis of rotation of coulter 50 is not parallel to the axis of up and down swinging movement of carrier 32 defined by bolt 30. Instead, the axis of rotation of coulter 50, denoted by the numeral 52 in FIGS. 4 and 5, is cocked forwardly so that it converges toward bolt 30 as arm 36 is approached. Thus, coulter 50 is correspondingly skewed at an oblique angle with respect to the forward path of travel of the implement, presenting a slightly leading or compression face 54 on one side and a trailing face 56 on the opposite side. Thus, as illustrated in FIGS. 1, 2, 3 and 8, coulter 50 cuts through the soil during field operations and pushes the soil slightly to one side (FIG. 2) to prepare a shallow trench or furrow 58 into which seeds and/or fertilizer may be deposited. In the illustrated embodiment, the coulter assembly 10 selected for purposes of illustration may be termed a "right hand" assembly wherein coulter 50 is angled with compression face 54 on the right side so as to correspondingly produce a slight lift or lip of soil 59 (FIG. 2) as coulter 50 travels through the soil. It will be noted also that coulter 50 is tilted back slightly so the bottom extremity of coulter 50 is somewhat closer to arm 36 than the top extremity. This also results in axis 52 being slightly upwardly and rightwardly inclined as illustrated in FIG. 2.

Carrier 32 and coulter 50 are yieldably biased downwardly by a coil spring assembly 60. Such assembly 60 includes an elongated, fore-and-aft extending, rigid strap 62 that is anchored at its rear end to a rearward portion of arm 34 and at its forward end passes through a slot 64 (FIGS. 4 and 10) in an upturned abutment plate 66 that is rigidly affixed to support 16 just above yoke 20. A retainer pin 68 or the like (FIG. 4) prevents strap 62 from pulling back out of slot 64 and keeps carrier 32 and coulter 50 from dropping down beyond a predetermined limit of travel. Spring assembly 60 further includes a coiled compression spring 70 trapped between abutment plate 66 at the upper end and a shoulder 72 at the lower end to provide yieldable resistance to upward swinging of carrier 32 and coulter 50.

Attached to the rear of arm 34 is a scraper assembly broadly denoted by the numeral 74. Assembly 74 includes a mounting bracket 76 bolted or otherwise secured to arm 34, and a slightly inwardly curved scraper blade 78 secured to the lower extremity of bracket 76. Blade 78 is designed to contact trailing face.56 of coulter 50 generally within the second quadrant thereof as viewed in FIG. 3 for the purpose of scraping dirt and mud from trailing face 56 as it begins to lift up and out of furrow 58. The lowermost edge of blade 78 is angled upwardly and forwardly in a diagonal manner across the lower rear portion of trailing face 56.

A generally upright placement tube 80 is attached to and supported by the rear of bracket 76, such tube 80 having a lower discharge end 82 that curves slightly downwardly and rearwardly generally in the vicinity of scraper blade 78. Discharge end 82 of tube 80 is located somewhat above the bottom of furrow 58 and in transverse alignment with scraper blade 78 behind the latter so as to be in a protected position for discharging substances into furrow 58, such as seeds and/or fertilizer. The upper end of placement tube 80 is, of course, coupled with a source of supply of the materials being deposited in furrow 58. An upwardly and forwardly angled mounting sleeve 84 is also carried on bracket 76 but substantially outboard of tube 80 for the purpose of supporting an optional discharge tube (not shown) for other substances.

A special vibratory cleaning tine 86 is mounted on carrier 32 in a resilient and adjustable manner for cleaning dirt and mud from the compression face 54 of coulter 50 without catching and accumulating trash. As illustrated in FIG. 6, tine 86 includes two major portions, i.e., an elongated working leg portion 88 and a transverse relief spring coil portion 90. Working leg 88 includes an upper or forward segment 92 that extends at generally right angles to the axis of transverse coil 90. Leg 88 further includes an intermediate, inturned segment 94 extending at an oblique angle to the axis of coil 90, and a working tip segment 96 that projects rearwardly from intermediate segment 94 almost at the same angle as upper segment 92 but preferably inturned slightly with respect to the longitudinal axis of upper segment 92.

Spring coil 90 of tine 86 is integral with leg 88 and comprises a plurality of side-by-side convolutions that progressively decrease in diameter as working leg 88 is departed. In the preferred embodiment, three of such convolutions 98, 100 and 102 are provided, with convolution 98 being the largest in diameter and convolution 102 being the smallest. At its uppermost end, tine 86 is provided with an outturned tang 104 that projects generally at right angles to the convolution 102 and away from coil 90. In one preferred embodiment tine 86 is constructed from 3/8" inch diameter oil tempered spring steel wire.

Tine 86 is mounted on carrier 32 by a special mount broadly denoted by the numeral 106. Mount 106 includes an upwardly and rearwardly angled arm 108 that is swingably attached to arm 36 of carrier 32 by a pivot bolt 100 which passes through a hole 112 in arm 36 as illustrated in FIG. 7, such bolt 110 defining a third axis of pivoting or rotational movement. Arm 108 has a cylindrical hub 114 rigidly affixed thereto such as by welding, the hub 114 projecting laterally outwardly from the outboard face of arm 108 and receiving a bushing 116 in concentric relationship to pivot bolt 110. Coil 90 of tine 86 encircles hub 114 and is trapped between the outboard face of arm 108 and a fore-and-aft extending leg 118 of a generally L-shaped keeper 120. Pivot bolt 110 serves to attach the entire assembly consisting of keeper 120, bushing 116, tine 86 and arm 108 to arm 36 of carrier 32.

Tine 86 is oriented on hub 114 of mount 106 in such a manner that working leg 88 is closest to arm 108, with coil 90 progressively decreasing in diameter as keeper 120 is approached. In a preferred embodiment, the largest convolution 98 is significantly larger in diameter than hub 114 so that convolution 98 does not engage the exterior surface of hub 114. Likewise, convolution 100 is, for the most part, sufficiently large in diameter that the interior surface of convolution 100 does not engage the exterior of hub 114. Convolution 102, on the other hand, has substantially the same internal diameter as the exterior diameter of hub 114 such that convolution 102 physically engages the exterior of hub 114 over a complete 360° of wrap. Tang 104 on convolution 102 projects through and is received within a retaining hole 122 in leg 118 of keeper 120. A first inturned protrusion 124 on leg 118 bears against smallest convolution 102 to help retain the latter in place on hub 114, while a second inturned leg 126 of keeper 120 overlies upper segment 92 of working leg 88 and underlies the bottom edge of mounting arm 108 as illustrated, for example, in FIG. 2.

Mount 106 and tine 86 are selectively adjustable about the axis of bolt 110 so as to permit adjustment of the angle of working tine leg 88 relative to the ground. As illustrated in FIG. 1, for example, working tine leg 88 extends generally downwardly and rearwardly diagonally across outer face 54 of coulter 50 just below axis 52, but that angle can be adjusted as may be necessary or appropriate considering the running depth of coulter 50 and/or the trash flow in the vicinity of tine 86. Generally speaking, it has been found beneficial to position the working tip segment 96 of tine 86 just slightly above the surface of the ground when coulter 50 is at operating depth. Moreover, it has been found that, in some conditions, tine 86 may more readily shed trash as working leg 88 is less inclined and more horizontally disposed. In any event, mechanism for rendering tine 86 selectively adjustable in this respect is broadly denoted by the numeral 128 and is the subject of related application Ser. No. 10/185,692, now pending, titled Depth Adjustment Mechanism For Farm Implements filed contemporaneously with the present application.

While details of adjustment mechanism 128 are described and claimed in the aforesaid co-pending application, mechanism 128 will be briefly described herein for a full and complete understanding of the present invention. To this end, it will be appreciated that mechanism 128 includes cooperating, interengageable structure on arm 36 of carrier 32 and arm 108 of mount 106. More specifically, arm 108 at its upper and rearmost end includes an enlarged, generally arcuately configured locking segment 130 provided with a series of side-by-side teeth 132 and notches 134. In the illustrated embodiment, a total of eight teeth 132 are provided, along with seven notches 134 interspersed between the teeth. The radially outermost faces 136 of teeth 132 are generally flat or at most slightly convexly radiused, while notches 134 are slightly tapered so as to widen progressively and by a small amount as the deep end of each notch is approached. Teeth 132 are substantially the same size as notches 134

The other part of adjustment mechanism 128, i.e., the structure on arm 36 of carrier 32, includes structure for selectively engaging teeth 132 and notches 134 for the purpose of holding mount arm 108 in a selected position about the axis of pivot bolt 110. Such structure includes a pair of generally upright detent bars 138 and 140 that are each sized and shaped to be easily received within a selected one of the notches 134. Detent bars 138 and 140 are spaced apart on the arc of swinging travel of locking segment 130 a distance equaling the combined width of one notch and one tooth and, more particularly, a center-to-center distance equal to three times the center-to-center distance between a notch and an adjacent tooth. Thus, as illustrated in FIG. 1, for example, when the detent bar 138 is aligned with a tooth 132, the detent bar 140 is aligned with a notch 134 on the other side of the next adjacent tooth. A pair of generally vertically spaced, superimposed guide plates 142 and 144 slidably receive the two detent bars 138,140 for individual reciprocation thereof toward and away from locking segment 130, and detent bars 138,140 are provided with coil compression springs 146 and 148 respectively for yieldably biasing the bars downwardly toward teeth 132 and notches 134. Cross pins 150 and 152 in detent bars 138 and 140 respectively trap springs 146 and 148 against the underside of upper guide plate 142 to carry out this function.

The detent bars 138 and 140 pass upwardly through and beyond upper guide plate 142 and are operably coupled at that location with a generally fore-and-aft extending operating lever 154. The forward end of lever of 154 is pivotally connected to the upper end of detent bar 140 via a pivot 156, while the mid-part of lever 154 is operably coupled with the upper end of detent bar 138 via a fore-and-aft slot 158 in lever 154 and a transverse pin 160 on bar 138. The distal end of lever 154 thus functions as a gripping portion to facilitate manual actuation of lever 154.

In this respect, viewing FIG. 1 as an example, when lever 154 is depressed downwardly and rearwardly at its rear end so as to generally pivot about pivot 160, the front end of lever 154 is raised, thereby extracting detent bar 140 from its notch. This effectively unlatches mount arm 108 and permits it to be manually indexed one digit forward or backward as may be desired, whereupon the coil spring 146 of detent bar 138 will snap bar 138 down into the next notch while detent bar 140 is blocked by the outer edge of an adjacent tooth from entering a notch. The operating end of lever 154 thus comes to be lowered relative to its FIG. 1 position, so that, to index mount arm 108 by the next increment, lever 154 must be lifted about pivot 156. When this happens, detent bar 138 is extracted from its notch so that mount arm 108 is unlatched until it is manually indexed one increment in either direction about the axis of pivot bolt 110, whereupon detent bar 140 snaps down into the next adjacent notch and detent bar 138 comes to rest upon the outer surface of a proximal tooth. In practice, if a significant amount of adjustment is desired, lever 154 is rocked through a series of successive lifting and lowering actions while mount arm 108 is essentially simultaneously moved in the desired direction and by the desired amount.

OPERATION

As coulter assembly 10 is pulled forwardly through the soil after being set at a selected depth, the relatively sharp peripheral edge on coulter 50 cuts through trash on the surface of the ground and opens a slice in the soil to the selected depth. Furthermore, as a result of the oblique attitude of coulter 50 relative to the path of travel of the implement, coulter 50 simultaneously widens the slice into a furrow having a width corresponding to the silhouette of the angled coulter as viewed from the front or the rear as illustrated in FIG. 2, for example. Fertilizer or seeds can be dropped into the resulting furrow 58 through placement tube 80, whereupon the lip of soil 59 formed on the compression side of coulter 50 can be pressed back down by a following closing wheel or other device to reclose the furrow and cover the deposited substance. If obstacles are encountered in the path of travel of the coulter 50, it simply rides up and over such obstacles, swinging upwardly about the axis of pivot bolt 30 as a unit with carrier 32 and the appended scraper 78 and tine 86. Coil spring 60 yieldably resists such movement and, once the obstacle is cleared, returns coulter 50 to the selected depth.

Figure 8:
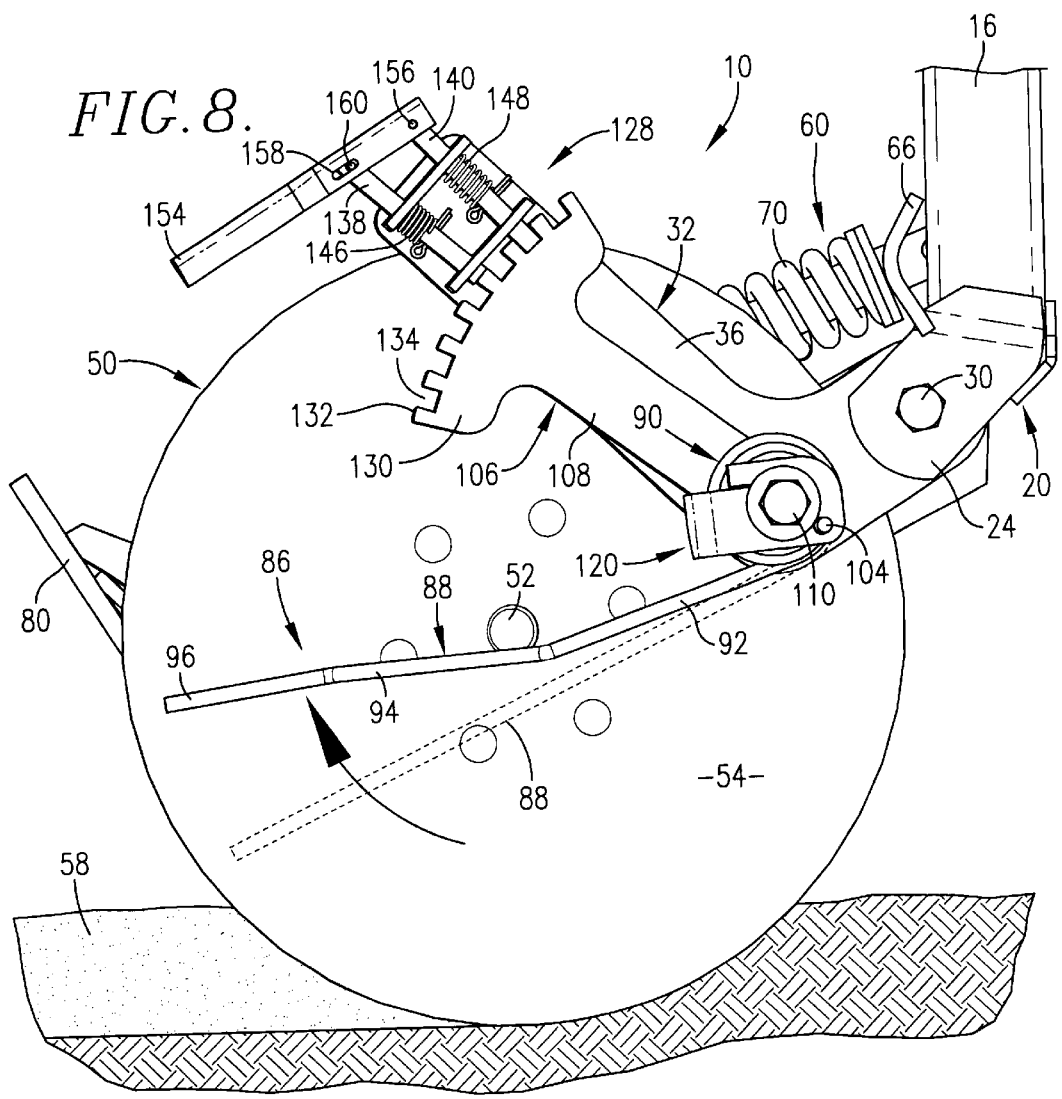
FIG. 8 is a right side elevational view of the coulter assembly of FIG. 1 illustrating the manner in which the cleaning tine is free to actively flex in a vertical plane to shed trash during field operations.
Figure 9:
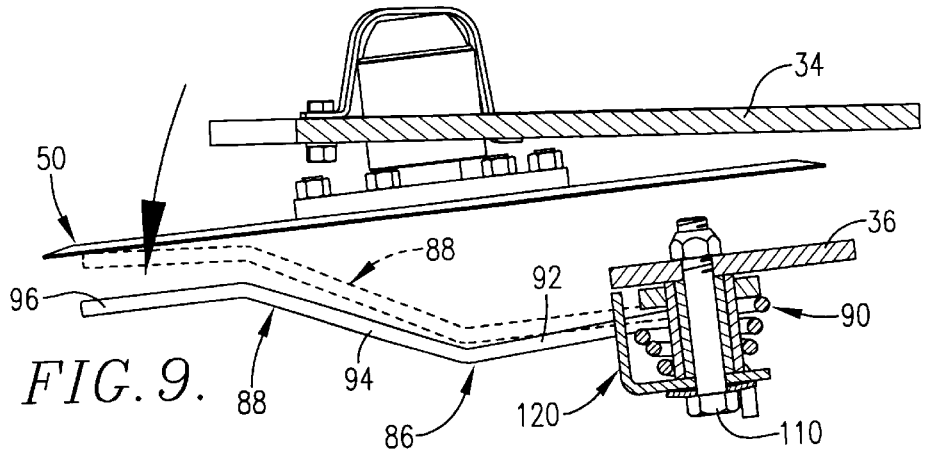
FIG. 9 is a cross-sectional view similar to FIG. 5 on a reduced scale illustrating the way in which the tine is free to actively flex toward and away from the face of the coulter during field operations to shed trash.

As coulter 50 rotates through the soil in its furrow-forming action, clumps of dirt tend to adhere to trailing portions thereof as they move up and out of furrow 58. However, scraper blade 78 continuously scrapes those materials from the trailing face 56 of coulter 50, while tine 86 performs the same function on compression face 54. While scraper blade 78 travels in the "shadow" or lee of coulter 50 and is thus essentially shielded from encounters with trash materials, tine 86 is not so protected and is instead fully exposed to trash materials that would tend to catch on working leg 88 thereof and accumulate. However, due in part to the resilient mounting of working leg 88 through spring coil 90, working leg 88 is constantly undergoing a vigorous vibratory action in a variety of planes that helps it shake free of trash materials that would otherwise cling and build up on the tine. Such action is caused in part by impacts with the trash materials themselves but, in addition, by the clumps of dirt adhering to the face 54 of coulter 50 and passing under the working tip 96 that otherwise always remains in metal-to-metal contact with face 54. Such encounters of tip 96 with dirt clumps has the tendency not only to flip the tine upwardly as illustrated in FIG. 8, but also to snap it outwardly away from the face of the coulter as illustrated in FIG. 9. Thus, the tine is continuously undergoing a lift and drop action as well as an in and out flexing, all of which has the effect of shaking otherwise clinging trash materials off the tine and on to the ground. Without build up of trash on the tine, tip 96 is free to maintain metal-to-contact with face 54 to provide improved cleaning action without trash build-up.

Due to the special design of coil 90, the spring action of working leg 88 is much more lively than would otherwise be the case. In this respect it will be noted that the two largest convolutions 98 and 100 of coil 90 are essentially open and unstressed when working leg 88 is under no load. Thus, not only is the inherent resiliency of operating leg 88 available over its operating length from hub 114 to working tip 96, but also the length of wire presented by the unconstricted convolutions 98 and 100 is available to provide a resilient action. Thus, as working leg 88 is forced upwardly as shown in FIG. 8 out of its nominal position, the two largest convolutions 98 and 100 have considerable space to constrict or contract in a tightening action around hub 114, thus storing up energy for a snap return of working leg 88 back toward its nominal or equilibrium position once the loading has been removed. Moreover, the open and unloaded condition of the two largest convolutions 98 and 100 allows them to twist and cant inwardly and outwardly as need be to provide for an extensive range of travel of operating leg 88 toward and away from compression face 54 as illustrated in FIG. 9 when a transverse loading is experienced by the working tip 96. Again, this greater range of motion and resilience than would be provided if convolutions 98, 100 and 102 were all tightly wrapped around hub 114 provides a more animated action on the part of tine 86 to resist the accumulation of trash materials.

Furthermore, this lively action of tine 86 can be obtained at any adjusted position thereof relative to coulter 50 and the ground surface. Regardless of the selected position of mount 106 about the axis of pivot bolt 110, the performance of coil 90 is unaffected. It will be observed in this respect that coil 90 does not in any way tighten or loosen on hub 114 as mount arm 108 is adjusted. Instead, tine 86, including both working leg 88 and coil 90, moves as a unit with mount 106 in the direction of adjustment. In some cases it may be desirable to have working leg 88 more or less angled than illustrated in FIG. 1, but in either case the performance of coil 90 remains the same to provide superior vibratory action.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. A coulter assembly comprising:

a support adapted for attachment to a frame of an implement;

a carrier pivotally attached to said support for up and down swinging movement relative thereto about a first transverse axis;

a coulter mounted on said carrier for rotation about a second transverse axis; and a vibratory trash-shedding tine rod resiliently coupled with said carrier in a manner to clean soil from a face of the rotating coulter during operation of the implement while preventing trash build-up on the tine rod.

2. A coulter assembly as claimed in claim 1, said tine rod including an elongated leg portion having a coulter-scraping tip disposed in direct contacting engagement with said face of the coulter, said tine rod further including as an integral part thereof a relief spring coil integrally connected to the leg portion remote from said tip.

3. A coulter assembly as claimed in claim 2, said tine rod being selectively vertically adjustable relative to the coulter for changing the angle of the tine rod relative to the ground.

4. A coulter assembly as claimed in claim 1, said tine rod being selectively vertically adjustable relative to the coulter for changing the angle of the tine rod relative to the ground.

5. A coulter assembly as claimed in claim 1, further comprising a mount supported by the carrier for pivotal adjusting movement about a third transverse axis, said tine rod being supported by said mount for adjusting movement therewith.

6. A coulter assembly comprising:

a support adapted for attachment to a frame of an implement;

a carrier pivotally attached to said support for up and down swinging movement relative thereto about a first transverse axis;

a coulter mounted on said carrier for rotation about a second transverse axis; and a vibratory trash-shedding tine resiliently coupled with said carrier in a manner to clean soil from a face of the rotating coulter during operation of the implement while preventing trash build-up on the tine, further comprising a mount supported by the carrier for pivotal adjusting movement about a third transverse axis, said tine being supported by said mount for adjusting movement therewith, said tine including an elongated leg portion having a coulter-scraping tip disposed in direct contacting engagement with said face of the coulter, said tine further including a relief spring coil integrally connected to the leg portion remote from said tip.

7. A coulter assembly as claimed in claim 6, said relief spring coil being connected between the leg portion of the tine and said mount.

8. A coulter assembly as claimed in claim 7, said mount including a generally cylindrical hub disposed concentrically with respect to said third axis, said relief spring coil comprising a plurality of side-by-side convolutions encircling said hub.

9. A coulter assembly as claimed in claim 8, said convolutions becoming progressively larger in diameter as said leg portion of the tine is approached.

10. A coulter assembly as claimed in claim 9, at least the convolution closest to said leg portion being larger in diameter than the hub.

11. A coulter assembly as claimed in claim 10, said relief spring coil comprising a set of three side-by-side convolutions on the hub, the convolution most remote from the leg being disposed in contacting engagement with the hub, the remaining two convolutions being larger in diameter than the hub.

12. A coulter assembly as claimed in claim 11, said most remote convolution having an outturned tang anchored to an adjacent portion of the mount.

* * * * *